US008184319B2

(12) United States Patent
Hagiwara

(10) Patent No.: US 8,184,319 B2
(45) Date of Patent: May 22, 2012

(54) PRINT MANAGEMENT APPARATUS, PRINT APPARATUS, PRINT SYSTEM, COMPUTER READABLE MEDIUM AND COMPUTER DATA SIGNAL THAT NOTIFY SPECIFIC PRINT INFORMATION

(75) Inventor: Nobuki Hagiwara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1092 days.

(21) Appl. No.: 11/892,287

(22) Filed: Aug. 21, 2007

(65) Prior Publication Data
US 2009/0021779 A1 Jan. 22, 2009

(30) Foreign Application Priority Data
Jan. 29, 2007 (JP) ................................. 2007-018398

(51) Int. Cl.
G06F 3/12 (2006.01)
G06F 3/00 (2006.01)
(52) U.S. Cl. ..................... 358/1.15; 358/1.13; 358/1.14; 719/318; 714/48
(58) Field of Classification Search ........ 358/1.13–1.15; 714/48; 719/318
See application file for complete search history.

(56) References Cited

U.S. PATENT DOCUMENTS

| 5,220,674 | A  | * | 6/1993  | Morgan et al. ............... 709/223 |
| 6,592,275 | B1 | * | 7/2003  | Aihara et al. ................... 400/62 |
| 7,284,061 | B2 | * | 10/2007 | Matsubayashi et al. ...... 709/229 |
| 7,894,089 | B2 | * | 2/2011  | Nauta ........................... 358/1.15 |
| 8,046,774 | B2 | * | 10/2011 | Tomita ......................... 719/318 |
| 2004/0073684 | A1 | * | 4/2004 | Jodra et al. .................... 709/228 |
| 2004/0190050 | A1 | * | 9/2004 | Sunohara ...................... 358/1.15 |
| 2005/0024675 | A1 | * | 2/2005 | Konno .......................... 358/1.15 |
| 2007/0002365 | A1 | * | 1/2007 | Pesar et al. .................... 358/1.15 |
| 2007/0008577 | A1 | * | 1/2007 | Matsuura et al. ............. 358/1.15 |
| 2007/0229882 | A1 | * | 10/2007 | Kondo ......................... 358/1.15 |

FOREIGN PATENT DOCUMENTS
JP A 8-339278 12/1996
* cited by examiner

*Primary Examiner* — Twyler Haskins
*Assistant Examiner* — Dennis Dicker
(74) *Attorney, Agent, or Firm* — Oliff & Berridge, PLC

(57) ABSTRACT

A print management apparatus includes a detection unit, a determination unit and a notification unit. The detection unit detects a specific print command. The determination unit determines a second person who gives another print command. The second person is different from a first person who gives the specific print command detected by the detection unit. The notification unit notifies, to the second person, information for prompting the second person to collect a printed matter that is output in response to the specific print command.

33 Claims, 10 Drawing Sheets

FIG. 2

```xml
<?xml version="1.0" encoding="UTF-8"?>
<Root>
        <User>
                <Group>2G-4T</Group>
                <Room>5B7</Room>
                <Partition>A</Partition>
                <Name>Fuji Hanako</Name>
                <Type>Normal</Type>
                <Deliver>5</Deliver>
                <Receive>0</Receive>
        </User>
        <User>
                <Group>2G-4T</Group>
                <Room>5B7</Room>
                <Partition>A</Partition>
                <Name>Fuji Ichiro</Name>
                <Type>Normal</Type>
                <Deliver>2</Deliver>
                <Receive>0</Receive>
        </User>
        <User>
                <Group>2G-4T</Group>
                <Room>5B7</Room>
                <Partition>A</Partition>
                <Name>Fuji Taro</Name>
                <Type>Receive Only</Type>
                <Deliver>0</Deliver>
                <Receive>10</Receive>
        </User>
        <User>
                <Group>2G-3T</Group>
                <Room>5B7</Room>
                <Partition>A</Partition>
                <Name>Fuji Jiro</Name>
                <Type>Normal</Type>
                <Deliver>3</Deliver>
                <Receive>0</Receive>
        </User>
        <User>
                <Group>2G-3T</Group>
                <Room>5B5</Room>
                <Partition>C</Partition>
                <Name>Fuji Saburo</Name>
                <Type>Normal</Type>
                <Deliver>0</Deliver>
                <Receive>0</Receive>
        </User>
</Root>
```

FIG. 6

```xml
<?xml version="1.0" encoding="UTF-8"?>
<Root>
        <User>
                <Group>2G-4T</Group>
                <Room>5B7</Room>
                <Partition>A</Partition>
                <Name>Fuji Hanako</Name>
                <Deliver>5</Deliver>
                <Receive>0</Receive>
        </User>
        <User>
                <Group>2G-4T</Group>
                <Room>5B7</Room>
                <Partition>A</Partition>
                <Name>Fuji Ichiro</Name>
                <Deliver>2</Deliver>
                <Receive>0</Receive>
        </User>
        <User>
                <Group>2G-4T</Group>
                <Room>5B7</Room>
                <Partition>A</Partition>
                <Name>Fuji Taro</Name>
                <Deliver>0</Deliver>
                <Receive>10</Receive>
        </User>
        <User>
                <Group>2G-3T</Group>
                <Room>5B7</Room>
                <Partition>A</Partition>
                <Name>Fuji Jiro</Name>
                <Deliver>3</Deliver>
                <Receive>0</Receive>
        </User>
        <User>
                <Group>2G-3T</Group>
                <Room>5B5</Room>
                <Partition>C</Partition>
                <Name>Fuji Saburo</Name>
                <Deliver>0</Deliver>
                <Receive>0</Receive>
        </User>
</Root>
```

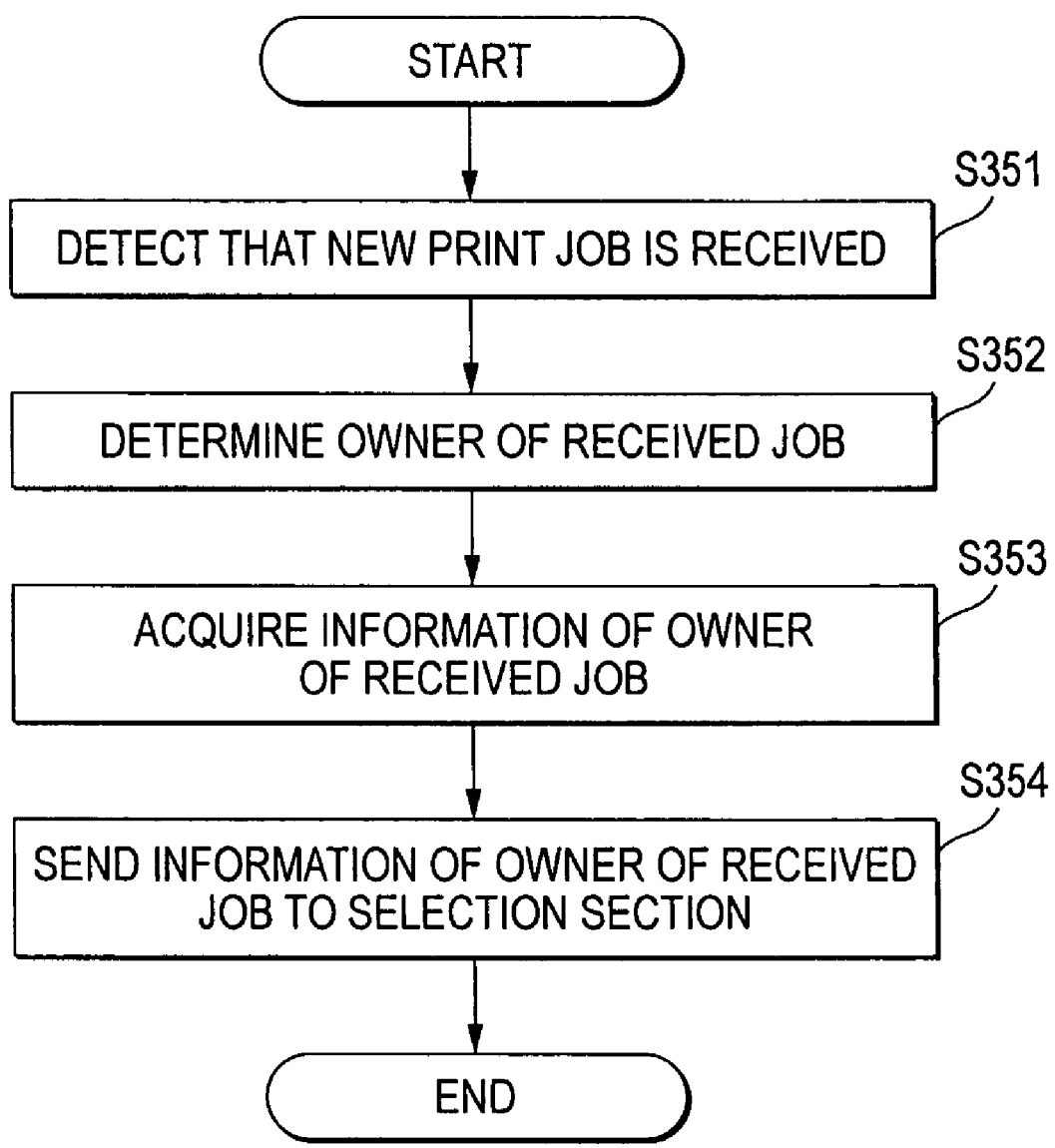

US 8,184,319 B2

PRINT MANAGEMENT APPARATUS, PRINT APPARATUS, PRINT SYSTEM, COMPUTER READABLE MEDIUM AND COMPUTER DATA SIGNAL THAT NOTIFY SPECIFIC PRINT INFORMATION

CROSS-REFERENCE TO RELATED APPLICATIONS

This application is based on and claims priority under 35 U.S.C. §119 from Japanese Patent Application No. 2007-18398 filed on Jan. 29, 2007.

BACKGROUND

Technical Field

The invention relates to a print management apparatus, a print apparatus, a print system, a computer readable medium storing a print management program and a computer data signal embedded with the print management program.

SUMMARY

According to an aspect of the invention, a print management apparatus includes a detection unit, a determination unit and a notification unit. The detection unit detects a specific print command. The determination unit determines a second person who gives another print command. The second person is different from a first person who gives the specific print command detected by the detection unit. The notification unit notifies, to the second person, information for prompting the second person to collect a printed matter that is output in response to the specific print command.

BRIEF DESCRIPTION OF THE DRAWINGS

Exemplary embodiments of the invention will be described in detail below with reference to the accompanying drawings, wherein:

FIG. 2 is a drawing to show an example of information in a user DB according to a first exemplary embodiment of the invention;

FIG. 6 is a drawing to show an example of information in a user DB according to a second exemplary embodiment of the invention;

FIG. 7 is a flowchart to show the operation of a detection section according to the second exemplary embodiment of the invention;

DETAILED DESCRIPTION

Exemplary embodiments of the invention will be described in detail with reference to the accompanying drawings.

To begin with, the general configuration of a print system according to the exemplary embodiments will be described.

Figure 1:
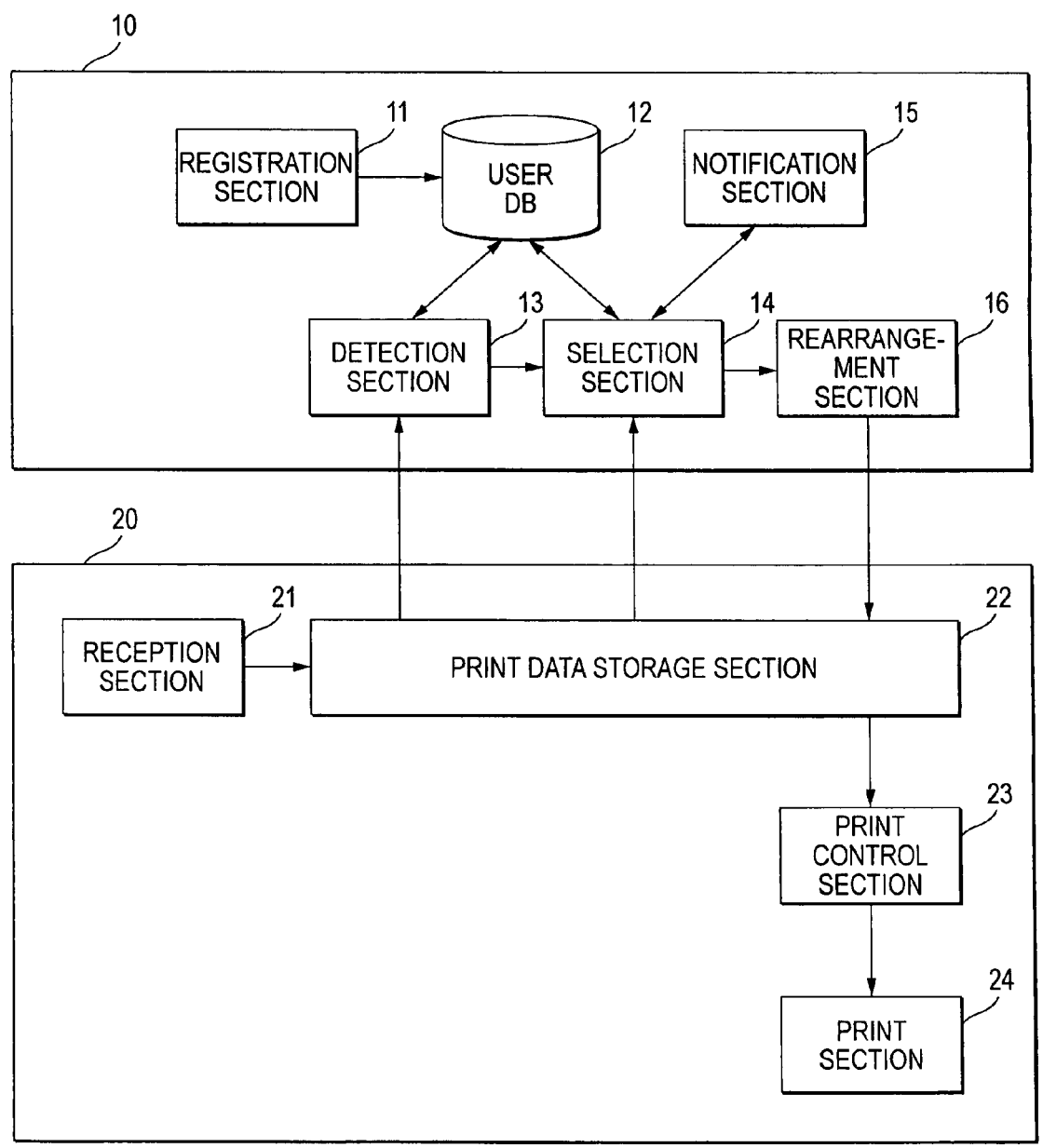
FIG. 1 is a block diagram to show the configuration of a system according to exemplary embodiments of the invention.

FIG. 1 shows a configuration example of the print system according to the exemplary embodiments.

As shown in FIG. 1, the print system mainly includes a print management apparatus 10 and a print apparatus 20. The print apparatus 20 may be implemented as a printer or may be implemented as a print server for issuing a print command to a printer managed by the print server in response to a print request from a client computer on a network. The print management apparatus 10 may be implemented as a client computer for transmitting a user's print request or may be implemented as a print server. The print management apparatus 10 may be built in a printer together with the print apparatus 20.

The print management apparatus 10 includes a registration section 11, a user DB 12, a detection section 13, a selection section 14, a notification section 15, and a rearrangement section 16. The print apparatus 20 includes a reception section 21, a print data storage section 22, a print control section 23, and a print section 24.

First, the components making up the print management apparatus 10 will be described.

When a user enters information of plural users who use the print system (user information) through an input device such a keyboard, for example, the registration section 11 receives the entered user information and registers it in the user DB 12.

The user DB 12 is a database for storing the user information about the plural users who use the print system. The user DB 12 is used to determine a priority of the users who collect printed matters. The user information stored in the database includes various pieces of information such as a user name and a group to which the user belongs, as described later in detail.

The detection section 13 monitors the print data storage section 22 in the print apparatus 20 and detects input of a new print job by detecting that data used to print (which will be hereinafter referred to as "print data") is stored in the print data storage section 22. As the print data, for example, PDL data described in a PDL (Print Description Language) is exemplified. Image data generated based on PDL data may be treated as "print data." The detection section 13 also acquires user information about a user who transmits print data from the user DB 12. In the exemplary embodiment, the detection section 13 is provided as an example of a detection unit that detects a specific print command.

The selection section 14 references the user DB 12 and selects another user who should collect a printed matter output in response to a print job instead of the user who inputs the print job detected by the detection section 13. In the exemplary embodiment, the selection section 14 is provided as an example of a determination unit that determines a second person who gives another print command, the second person being different from a first person giving the specific print command. Also, the selection section 14 is provided as an example of a determination unit that determines a second person in response to an output command of a printed matter, the second person being different from a first person who gives the output command, the second person giving another output command of a printed matter within a predetermined time period before or after the printed matter is output in response to the print command given by the first person.

The notification section 15 notifies, to the user who inputs the print job detected by the detection section 13, the other user who will collect a printed matter that is output in response to the print job. The notification section 15 also notifies, to the user selected by the selection section 14, a request for collecting a printed matter of another user. In this case, the request for collecting the printed matter may be notified by popping up a dialog box on a desk top of the client computer operated by the selected user. Alternatively, the request may be notified to the selected user by e-mail. In the exemplary embodiment, the notification section 15 is provided as an example of a notification unit that notifies, to the second person, information for prompting the second person to collect the printed matter output in response to the specific print command. Also, the notification section 15 is provided as an example of a notification unit that notifies, to the second person, information for prompting the second person to collect a printed matter for which the first person gives the output command.

The rearrangement section 16 rearranges print data, which is used in print jobs, on the print data storage section 22 so that the printed matter output in response to the print job detected by the detection section 13 and a printed matter output in response to the print job input by the user who should collect that printed matter are output in succession. In the exemplary embodiment, the rearrangement section 16 is provided as an example of a rearrangement unit that rearranges an output order so that printed matter output in response to the specific print command and a printed matter output in response to a print command given by the second person are output in succession. Also, the rearrangement section 16 is provided as an example of a rearrangement unit that rearranges an output order so that a printed matter for which the first person gives an output command and a printed matter for which the second person gives an output command is given by the second person are output in succession.

The components making up the print apparatus 20 will be described.

The reception section 21 receives a print job input by the user and stores print data, which is used in the print job, in the print data storage section 22. At this time, the print data is stored in the print data storage section 22 in order so that a printed matter responsive to an earlier received print job is output earlier.

The print data storage section 22 stores the print data used in the print jobs in the reception order so as to provide a "print queue." The print data may be PDL data or may be image data as previously described.

The print control section 23 outputs the print data stored in the print data storage section 22 to the print section 24. At this time, the print control section 23 executes a color conversion process of converting the print data into colors adapted to the print section 24, a halftone process of converting the print data into binary data if the print data is represented as multi-level data, and the like.

The print section 24 prints an image based on the print data output by the print control section 23 on a medium such as a sheet of paper for output as a printed matter. As the print section 24, for example, an electrophotographic print engine is available. However, a print engine using any other system such as an ink jet system may be adopted.

By the way, the exemplary embodiments provide the following two types of mechanism as a mechanism for requesting another user to collect a printed matter output by one user rather than the one user collects it by herself.

One is a mechanism in an environment in which it is difficult for the user to collect a printed matter by herself or the user does not want to collect a printed matter by herself. For example, the printed matter of a user who is hard to go to a printer and collect the printed matter because of a physically handicapped person is collected by another user instead of the one user.

The other is a mechanism which is application of the former type to users who are capable of collecting printed matters by themselves. For example, if plural users belonging to the same group or placed at near locations print at close times, one of the users also collects the printed matters of other users in addition to her printed matter.

Both mechanisms are intended to efficiently collect printed matters by reducing number of users who go to the printer and collect the printed matters.

The former mechanism will be described as a first exemplary embodiment and the latter as a second exemplary embodiment.

First Exemplary Embodiment

The first and second exemplary embodiments differ slightly in information stored in the user DB 12. Therefore, at first, the information in the user DB 12 according to the first exemplary embodiment will be described.

FIG. 2 shows a specific example of user information in the user DB 12.

FIG. 2 shows the information in the user DB 12 in an XML format. However, it should be noted that FIG. 2 is for illustrative purposes only and any other format may be adopted.

Here, information of one user is described between <User> and </User>.

Information indicating a group to which the user belongs is described between <Group> and </Group>. Information indicating a room where the user works is described between <Room> and </Room>. Information indicating a partition where the user works (chair position in the room) is described between <Partition> and </Partition>. Identification information of the user is described between <Name> and </Name>. In FIG. 2, a full name is described. However, employee number, etc., for uniquely identifying the user may be described therein.

Further, "Normal" or "Receive Only" is described between <type> and </type>. "Normal" indicates that the user can collect printed matter by himself. In contrast, "Receive Only" indicates that the user is a specific user who does not collect a printed matter by herself and only receives a printed matter (hereinafter the user will be referred to as "specific user"). For example, the specific user is a user who is hard to collect a printed matter by herself because of a physically handicapped person. In the example, "Fuji Hanako," "Fuji Ichiro," "Fuji Taro," "Fuji Jiro," and "Fuji Saburo" are registered as the users. Among them, only "Fuji Taro" is a specific user.

A numeric value described between "Deliver" and "/Deliver" indicates number of times the user has delivered printed matters to other users. A numeric value described between "Receive" and "/Receive" indicates number of times the user has received printed matters from other users.

It is assumed that such user information is stored in the user DB 12. Then, the operation of the exemplary embodiment starts.

The operation of the exemplary embodiment will be described below in detail.

First, when the user inputs a print job, the reception section 21 receives the print job and stores print data, which is used in the print job, in the print data storage section 22.

Then, the operation of the detection section 13 starts.

Figure 3:
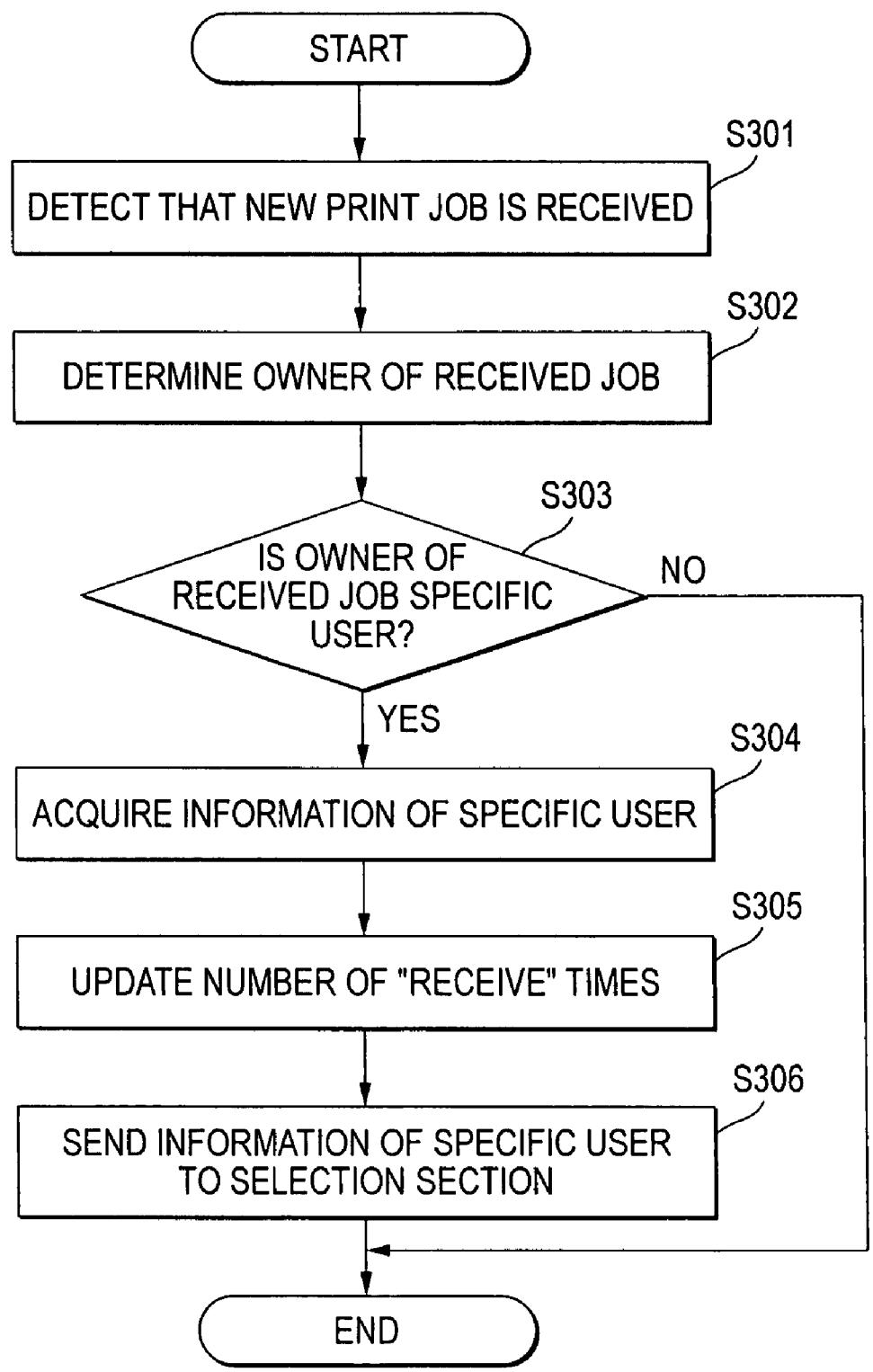
FIG. 3 is a flowchart to show the operation of a detection section according to the first exemplary embodiment of the invention.

FIG. 3 is a flowchart to show the operation of the detection section 13 at this time.

The detection section 13 monitors the print data storage section 22 and detects that a new print job is received, by detecting that new print data is stored in the print data storage section 22 (step 301). The detection section 13 references information attached to the received job (received job) and determines an owner of the received job (step 302).

Next, the detection section 13 references the user DB 12 and determines as to whether or not the owner of the received job is the specific user (step 303). Specifically, at first, the detection section 13 searches the user information stored in the user DB 12 for identification information of the owner of the received job described between <Name> and </Name>. Then, the detection section 13 determines as to whether or not "Receive Only" is described between <type> and </type> in the found user information.

If the detection section 13 determines that the owner of the received job is the specific user, the detection section 13 acquires information of the specific user from the user DB 12 (step 304). That is, the detection section 13 acquires information described between <Group> and </Group>, information described between <Room> and </Room>, information described between <Partition> and </Partition>, and information described between <Deliver> and </Deliver> in the user information found at step 303. At this point in time, the detection section 13 increments the numeric value described between <Receive> and </Receive> by one (step 305). The exemplary embodiment is premised on that any other user always delivers a printed matter to the specific user. Therefore, it is seen that the number of times the user has received printed matters from any other user will be incremented by "one" when the print job of the specific user is received. The detection section 13 sends the acquired information of the specific user to the selection section 14 (step 306).

On the other hand, if it is determined that the owner of the received job is not the specific user, the process is terminated.

Next, the operation of the selection section 14 to which the information of the specific user is sent at step 306 starts.

Figure 4:
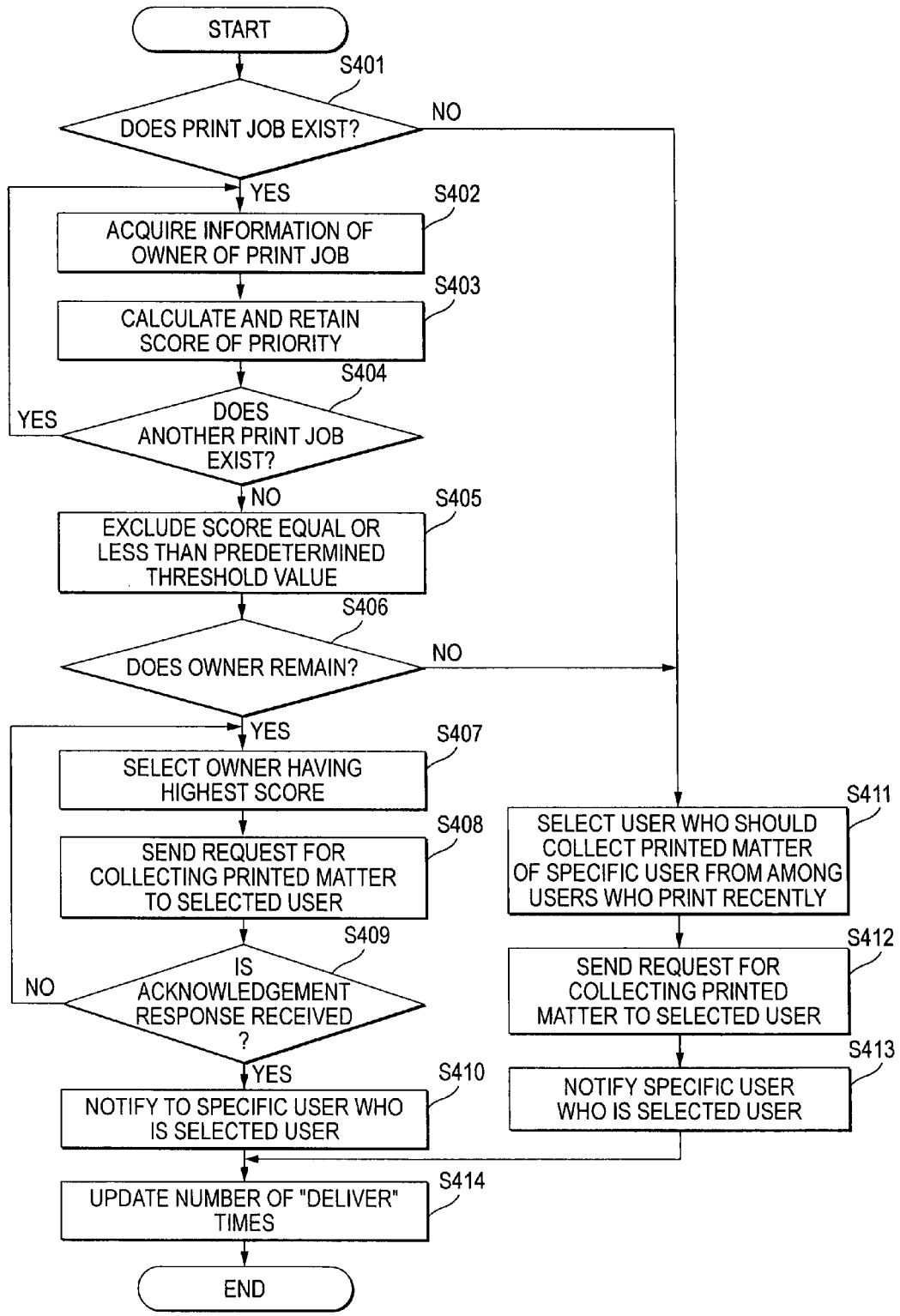
FIG. 4 is a flowchart to show the operation of a selection section according to the first exemplary embodiment of the invention.

FIG. 4 is a flowchart to show the operation of the selection section 14 at this time.

The selection section 14 first determines as to whether or not print data is stored in the print data storage section 22, to thereby determine as to whether or not print job(s) exists in the print queue (step 401).

If the selection section 14 determines that print job(s) exists, the selection section 14 determines an owner of one of the print jobs and acquires information of the owner from the user DB 12 (step 402). Specifically, at first, the selection section 14 searches the user information stored in the user DB 12 for identification information of the owner of the print job described between <Name> and </Name>. Then, the selection section 14 acquires information described between <Group> and </Group>, information described between <Room> and </Room>, information described between <Partition> and </Partition>, and information described between <Deliver> and </Deliver> in the user information.

Then, the selection section 14 calculates a score of a priority of the owner of the print job based on (i) the information of the specific user sent at step 305 and (ii) the information of the owner of the print job acquired at step 402, and retains the result in memory (step 403).

Thus, in the exemplary embodiment, at first, a user who delivers the printed matter of the specific is selected from among other users who print at a close time (within a predetermined time period). If such a user can be selected, there are high possibilities that the printed matter of the specific user would already be output when the selected user goes to the printer to collect her printed matter. Even if the printed matter of the specific user is not output, the printed matter of the specific user will be output after a while. Thus, it is easy for the selected user to collect the printed matter of the specific user on the way. Such a selection method of the user who should collect the printed matter of the specific user is based on attributes of the printed matters output by the respective users. The attributes of the printed matter may be a location of a tray where the printed matter is output or the number of output sheets of the printed matter, for example.

The score of the priority calculated at step 403 is an index indicating how much the owner of the print job in question is convenient for delivering the printed matter of the specific user. Therefore, any information that can be obtained by any calculation may be adopted if it can be used as such an index. Here, for example, the following index is considered:

First, as a user is at an organizationally or physically nearer position to the specific user, the score of the user becomes higher. For example, the score of the user at a nearer chair to the specific user or the score of the user in the same group as the specific user becomes higher. It is considered that such a user usually is in contact with the specific user and there are high possibilities that the user may be at a location where the user easily delivers a printed matter. Therefore, a mental burden on the specific user and load of number of steps of the user collecting printed matters are lightened. Specifically, whether or not the user and the specific user belong to the same group, whether or not they are in the same room, and whether or not they are in the same partition may be represented by points. The points may be totalized as a score. The points may be weighted before they are totalized. Higher score can be given in order of the user belonging to the same group as the specific user, the user in the same partition as the specific user, and the user in the same room as the specific user by way of example.

The score of each user may be calculated based on the past results of delivering printed matter to the specific user. In this case, there are a method of giving a higher score to the user who more frequently delivers printed matters to the specific user and a method of giving a higher score to a user who less frequently delivers printed matters to the specific user. The former is intended for selecting a user with a high possibility of delivering printed matters without rejecting a request for collecting printed matters. The latter is intended for sharing the collecting load of printed matters of the specific user among the users without partiality.

Although the two methods are described separately as the priority score calculation method, the scores may be used in combination of these methods to determining the user who should collect a printed matter. For example, the score of each user is calculated based on whether or not the user is at an organizationally or physically near position to the specific user. If plural users have the same score, one of the users may be determined as the user to collect a printed matter based on the past results of delivering printed matter.

When the selection section 14 thus calculates the score of the priority, the selection section 14 determines as to whether or not any other print data is stored in the print data storage section 22, to thereby determine as to whether or not another print job exists (step 404).

As a result, if the selection section 14 determines that another print job exists, the selection section 14 executes steps 402 and 403 for the print job. If the selection section 14 does not determine that another print job exists, the selection section 14 goes to step 405.

At this point in time, the priority scores are stored in the memory, for the owners of all print jobs in the print queue. Then, the selection section 14 excludes the owners having a score which is equal or less than a predetermined threshold value from among the scores (step 405) so that the user who is too much inconvenient for collecting a printed matter of the specific user is not selected.

As a result, it is determined as to whether or not an owner remains in the memory (step 406).

Figure 5A:
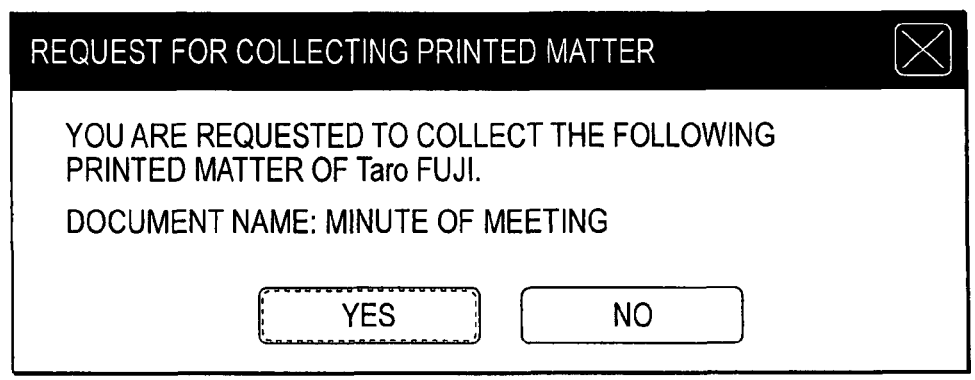
FIG. 5 is a drawing to show examples of dialog boxes displayed in the first exemplary embodiment of the invention.

If at least one owner remains, the selection section 14 selects the owner having the highest score as a user who should deliver the printed matter to the specific user (step 407). The selection section 14 instructs the notification section 15 to send, to the selected user, a request for collecting the printed matter of the specific user (step 408). Accordingly, the notification section 15 sends the request for collecting the printed matter by displaying a pop-up on the desk top of the client operated by the selected user, for example. An example of the pop-up displayed at this time is shown in FIG. 5A, for example. Alternatively, the request for collecting the printed matter may be sent to an e-mail address of the selected user rather than the pop-up.

By the way, even if such a request for collecting the printed matter is sent, there are (i) a case where the selected user leaves his or her seat and (ii) a case where although the selected user is seated, he or she is unaware of the sent request. Furthermore, even If the selected user is seated and is aware of the sent request, he or she may want to reject the request for collecting the printed matter for some reason. As a solution to such cases, the exemplary embodiment adopts such a configuration that the user who should collect the printed matter of the specific user is determined on condition that the selected user makes an acknowledgement response to the request for collecting the printed matter and the print management apparatus 10 receives this response. That is, when the notification section 15 receives the acknowledgement response from the selected user, the notification section 15 sends it to the selection section 14.

Therefore, after instructing the notification section 15 to send the request for collecting the printed matter, the selection section 14 determines as to whether or not the acknowledgement response is received from the selected user (step 409).

If the acknowledgement response is not received, the selection section 14 repeats steps 407 and 408. In this case, the owner having the highest score at step 407 is an owner having the highest score in a state where the owner returning no acknowledgement response to the request for collecting the printed matter although the owner is already selected is excluded.

Figure 5B:
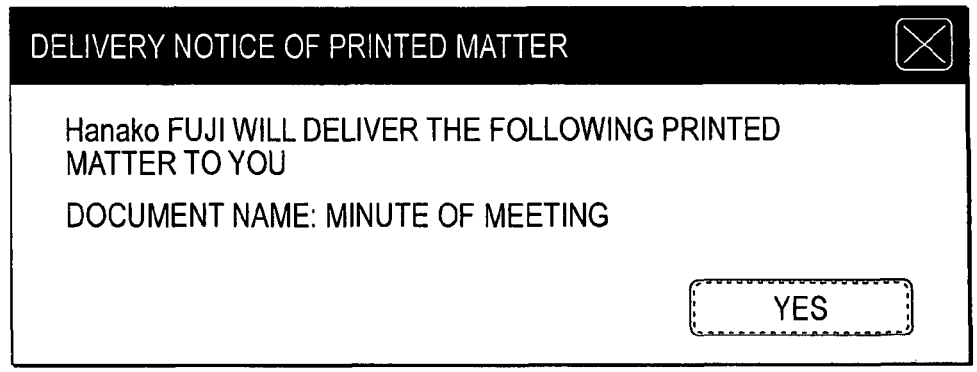

On the other hand, if the acknowledgement response is received, the selection section 14 instructs the notification section 15 to notify the specific user that the selected user will deliver her printed matter (step 410). Accordingly, the notification section 15 displays a pop-up on the desk top of the client operated by the specific user, for example, to thereby notify who is the selected user to the specific user. An example of the pop-up displayed at this time is shown in FIG. 5B. Alternatively, notification of the selected user may be sent to an e-mail address of the specific user rather than the pop-up.

If it is determined at step 401 that no print job exist in the print queue or if it is determined at step 406 that no owner remains in the memory, the user who should collect the printed matter of the specific user is selected from among the users who print recently (step 411). This is because it is considered that there are high possibilities that the users who print recently would be seated. The selection section 14 instructs the notification section 15 to send a request for collecting the printed matter of the specific user to the selected user (step 412). Accordingly, the notification section 15 sends the request for collecting the printed matter by displaying a pop-up on the desk top of the client operated by the selected user, for example. An example of the pop-up displayed at this time is shown in FIG. 5A. Alternatively, the request for collecting the printed matter may be sent to an e-mail address of the selected user rather than the pop-up.

Also in this case, the configuration that the selected user returns an acknowledgement response to the request for collecting the printed matter may be adopted. If no acknowledgement response is returned, another user who prints recently is selected. It is noted that this processing flow is not shown in the flowchart of FIG. 4.

Then, the selection section 14 instructs the notification section 15 to notify the specific user that the selected user will deliver printed matter (step 413). Accordingly, the notification section 15 displays a pop-up on the desk top of the client operated by the specific user, for example, to thereby notify who is the selected user to the specific user. An example of the pop-up displayed at this time is shown in FIG. 5B. Alternatively, notification of the selected user may be sent to an e-mail address of the specific user rather than the pop-up.

When the user who should collect the printed matter of the specific user is determined by performing the process as described above, the selection section 14 updates the information regarding the past results of collecting stored in the user DB 12. In this case, since the detection section 13 increments, by one, the numeric value between <Receive> and </Receive> for the specific user in the user DB 12, the selection section 14 increments, by one, only the numeric value between <Deliver> and </Deliver> for the user who should collect the printed matter (step 414).

By the way, if the print data used in the print job of the specific user and the print data used in the print job of the user who should collect the printed matter of the specific user are not in succession in the print data storage section 22, the printed matters responsive to the print jobs are not output in succession. In this case, it is concerned that the user who should collect the printed matter of the specific user may have to wait for output of the printed matter to be collected in front of a printer or may collect the printed matter of any other user rather than the specific user by mistake. Then, in the exemplary embodiment, after the selection section 14 determines the user who should collect the printed matter of the specific user, the rearrangement section 16 rearranges the print jobs so that the printed matter of the specific user and the printed matter of the user who should collect the printed matter of the specific user are output in succession. Specifically, if the print data used in the print job of the specific user and the print data used in the print job of the user who should collect printed matter of the specific user are not continuous in the print data storage section 22, the rearrangement section 16 rearranges the print jobs so that they become continuous.

There are two ways to rearrange the print jobs so that they become continuous. That is, there are (i) the case where after the printed matter of the specific user is output, the printed matter of the user who should collect the printed matter of the specific user is output and (ii) the case where before the printed matter of the specific user is output, the printed matter of the user who should collect the printed matter is output.

Particularly, if the print jobs are sorted in the former manner (the printed matter of the specific user is first output and then the printed matter of the user who should collect the printed matter is output), when the printed matter of the user who should collect the printed matter of the specific user is output, the user who should collect the printed matter of the specific user may collect the printed matter output just before his or her printed matter is output and need not wait for output of the printed matter of another person (specific user) after his or her printed matter is output.

If the print jobs are sorted in the latter manner (the printed matter of the user who should collect the printed matter is first output and then the printed matter of the specific user is output), after checking that his or her printed matter is output, the user who should collect the printed matter may collect the output to be collected.

Further, the print jobs may be sorted so that the user who should collect the printed matter of the specific user is selected from among the users who have later print order than the specific user and the rearrangement may be made so that the printed matter of the user who should collect the printed matter of the specific user is printed just before or just after the printed matter of the specific user. In so doing, the user who collects the printed matter of another person (specific user) with good intent is given such an advantage that his or her printed matter is printed earlier than the original order.

Further, in the exemplary embodiment, a device for marking the printed matter of the specific user may be provided as a device that allows the user who should collect the printed matter of the specific user to distinguish the printed matter of the specific user from other printed matters. For example, identification information of the specific user may be printed on the printed matter of the specific user. In this case, such a configuration may be adopted that when the detection section 13 detects the print job of the specific user, an information addition section (not shown) adds a command for printing the identification information of the specific user to the print data of the specific user stored in the print data storage section 22. The identification information of the user who should collect the printed matter of the specific user may be printed on the printed matter. In this case, such a configuration may be adopted that when the selection section 14 determines the user who should collect the printed matter, the information addition section (not shown) adds a command for printing the identification information of the determined user to the print data of the specific user stored in the print data storage section 22.

Also, as a method of allowing the user who should collect the printed matter of the specific user to distinguish the printed matter of the specific user from other printed matters, for example, various methods may be adopted such as (i) a method of shifting the printed matter of the specific user from other printed matters for output and (ii) a method of rotating the printed matter of the specific user for output.

Further, in the exemplary embodiment, if it is determined at step 401 that no print job exists in the print queue, the user who should collect the printed matter is selected from among the users who print recently. However, such a configuration may be adopted that the specific user is notified that no user who collects the printed matter of the specific user exist. In this case, it is determined as to whether or not the printed matter is delivered to the specific user, after the selection section 14 makes a determination regarding the user who should collect the printed matter of the specific user. Therefore, the selection section 14 updates the number of "Receive" times in the user DB 12.

As another embodiment, the print data used in a print job may be stored in the print data storage section 22 in advance, and when the user enters an additional output command through an operation section of the print apparatus 20, print may be executed. In this case, when the user enters an output command of the stored print job through the operation section, it is detected as to whether or not a print job of a specific user having some relation with the user who enters the output command exists. If such a print job exists, the printed matter of the specific user may be printed together with the printed matter of the user who enters the output command. At this time, for the user who enters the output command, a message indicating that the printed matter of the specific user is output together with her printed matter may be displayed on a display section of the print apparatus 20.

In the first exemplary embodiment, the specific user is previously registered in the user DB 12. However, the first exemplary embodiment is not limited thereto. That is, when the user makes a print request, he or she may specify a request for another user to collect a printed matter, which is output in response to the print request. In this case, the user is regarded as "specific user" in the print request and similar processing to that described above is performed.

Second Exemplary Embodiment

At first, information stored in the user DB 12 in the second exemplary embodiment will be described. In the second exemplary embodiment, the user DB 12 serves as a database that retains a printed matter collection relation among users.

FIG. 6 shows a specific example of user information stored in the user DB 12.

FIG. 6 shows the information stored in the user DB 12 in an XML format. However, FIG. 6 is for illustrative purposes only and any other format may be adopted.

The user information in the user DB 12 according to the second exemplary embodiment is almost the same as the user information in the user DB 12 shown in FIG. 2. In the second exemplary embodiment, however, the concept of "specific user" is not adopted. Therefore, distinction between "Normal" and "Receive Only" each described between <type> and </type> in FIG. 2 is not defined.

It is assumed that such user information is stored in the user DB 12. Then, the operation of the exemplary embodiment starts.

The operation of the exemplary embodiment will be described below in detail.

First, when a user inputs a print job, the reception section 21 receives the print job and stores print data, which is used in the print job, in the print data storage section 22.

Then, the operation of the detection section 13 starts.

FIG. 7 is a flowchart to show the operation of the detection section 13 at this time.

The detection section 13 monitors the print data storage section 22 and detects that a new print job is received, by detecting that new print data is stored in the print data storage section 22 (step 351). The detection section 13 references information attached to the received job (received job) and determines an owner of the received job (step 352).

Next, the detection section 13 acquires information of the owner of the received job from the user DB 12 (step 353). Specifically, at first, the detection section 13 searches the user information stored in the user DB 12 for identification information of the owner of the received job described between <Name> and </Name>. Then, the detection section 13 acquires information described between <Group> and </Group>, information described between <Room> and </Room>, information described between <Partition> and </Partition>, and information described between <Deliver> and </Deliver> in the user information. The detection section 13 sends, to the selection section 14, the acquired information of the owner of the received job (step 354).

Next, the operation of the selection section 14 to which the information of the owner of the received job is sent at step 354 starts.

Figure 8:
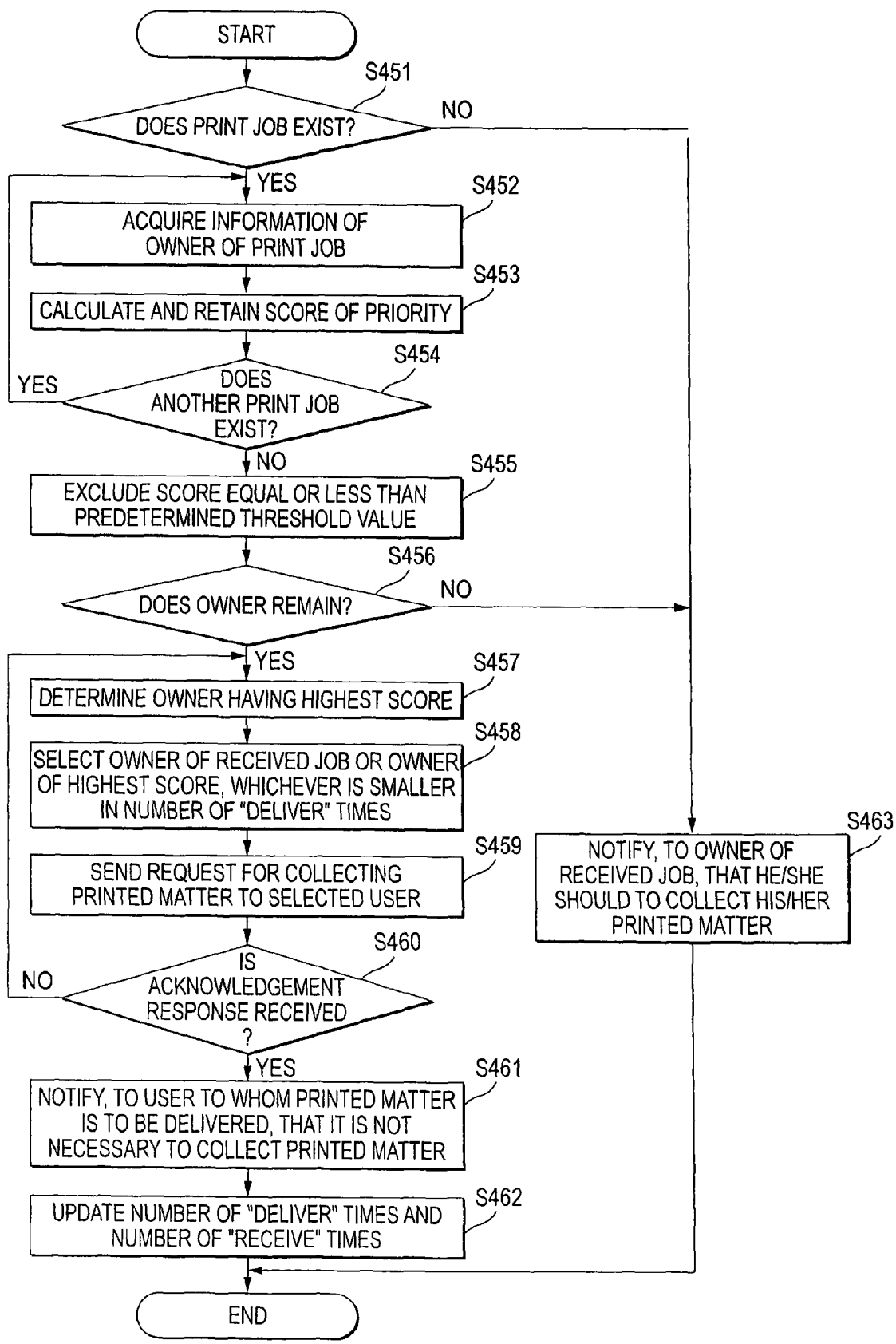
FIG. 8 is a flowchart to show the operation of a selection section according to the second exemplary embodiment of the invention.

FIG. 8 is a flowchart to show the operation of the selection section 14 at this time.

At first, the selection section 14 determines as to whether or not print data is stored in the print data storage section 22, to thereby determine as to whether or not at least one print job exists in a print queue (step 451).

If the selection section 14 determines that print job(s) exists, the selection section 14 determines the owner of one of the print jobs and acquires information of the owner from the user DB 12 (step 452). Specifically, at first, the selection section 14 searches the user information stored in the user DB 12 for identification information of the owner of the print job described between <Name> and </Name>. Then, the selection section 14 acquires information described between <Group> and </Group>, information described between <Room> and </Room>, information described between <Partition> and </Partition>, and information described between <Deliver> and </Deliver> in the user information.

Then, the selection section 14 calculates a score of priority of the owner of the print job based on (i) the information of the owner of the received job sent at step 354 and (ii) the information of the owner of the print job acquired at step 452, and retains the result in memory (step 453).

Thus, in the exemplary embodiment, at first, a user who delivers a printed matter, which is output in response to the received job (a printed matter which is formed based on the received job), is selected from among other users who print at a close time (within a predetermined time period). If such a user is selected, there are high possibilities that the printed matter, which is formed based on the received job, would be already output when the selected user collects his or her printed matter. If the printed matter, which is formed based on the received job, is not yet output, it will be output after a while. Thus, it is easy for the user to collect the printed matter, which is formed based on the received job, on the way. Such a selection method of the user who should collect the printed matter, which is formed based on the received job, is based on attributes of printed matters output by respective users. The attributes of the printed matter may be a location of a tray where the printed matter is output, number of output sheets of the printed matter, etc., for example.

The score of the priority calculated at step 453 is an index indicating how much the owner of the print job in question is convenient for delivering the printed matter, which is formed based on the received job. Therefore, any information that can be obtained by any calculation may be adopted if it can be used as such an index. Here, for example, the following index is considered:

At first, as the user is at an organizationally or physically nearer position to the owner of the received job, the score of the user becomes higher. For example, the score of the user at a nearer chair to the user of the owner of the received job or the score of the user in the same group as the user of the owner of the received job becomes higher. It is considered that such a user usually is in contact with the user of the owner of the received job and there are high possibilities that the user would be at a location where the user easily delivers a printed matter. Therefore, a mental burden on the owner of the received job and load of the number of steps of the user collecting printed matter are lightened. Specifically, whether or not the user and the owner of the received job belong to the same group, whether or not they are in the same room, and whether or not they are in the same partition may be represented by points and the points may be totalized as the score. The points may be weighted before they are totalized. Higher score may be given in order to a user belonging to the same group as the owner of the received job, a user in the same partition as the owner of the received job, and a user in the same room as the owner of the received job, by way of example.

The score of each user may be calculated based on the past results of delivering printed matters to other users. In this case, a method of giving a higher score to a user who has less frequently delivered printed matters to other users may be available. The method is intended for sharing the collecting load of printed matters to other users among the users without partiality.

Although the two methods are described separately as the priority score calculation method, the two methods may be used in combination to determine the user who should collect a printed matter. For example, the score of each user is calculated based on whether or not the user is at an organizationally or physically near position to the owner of the received job. If plural users have the same score, one of such users may be determined as a user who should collect a printed matter based on the past results of delivering printed matters.

When the selection section 14 thus calculates the score of the priority, the selection section 14 determines as to whether or not any other print data is stored in the print data storage section 22, to thereby determine as to whether or not another print job exists (step 454).

As a result, if the selection section 14 determines that another print job exists, it executes steps 452 and 453 for the other print job. If the selection section 14 determines that no print job exists, the process goes to step 455.

At this point in time, the priority scores are stored in the memory, for the owners of all print jobs in the print queue. Then, the selection section 14 excludes the owners having scores which are equal to less than a predetermined threshold value from among the scores (step 455) so that the user who is too much inconvenient for collecting the printed matter, which is formed based on the received job, is not selected.

As a result, it is determined as to whether or not at least one owner remains in the memory (step 456).

Figure 9A:
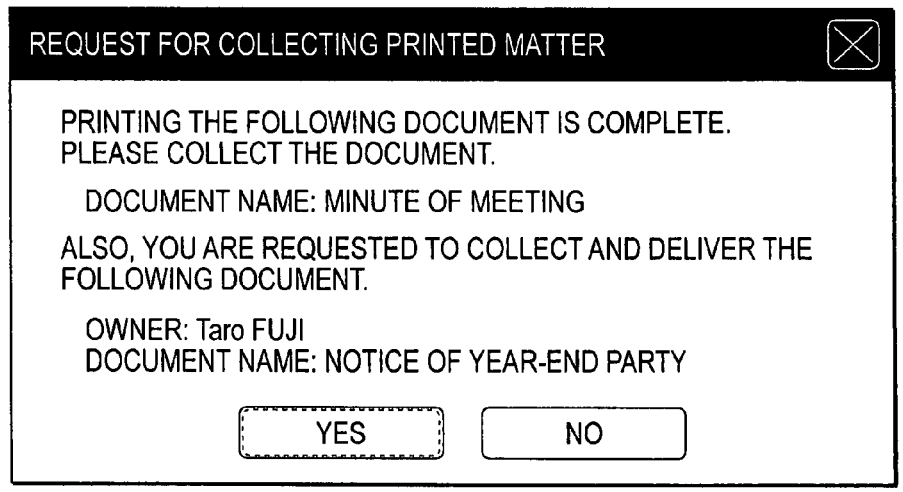
FIG. 9 is a drawing to show examples of dialog boxes displayed in the second exemplary embodiment of the invention.

If owner(s) remains, the selection section 14 selects an owner having the highest score (step 457). The selection section 14 makes a comparison between number of times the owner of the received job has delivered printed matters to other users and number of times the owner having the highest score determined at step 457 has delivered printed matters to other users, and selects an owner involving the smaller number of times as a user who should collect printed matter (step 458). The second exemplary embodiment is intended for the users who can collect printed matter to mutually collect printed matter. Therefore, the second exemplary embodiment adopts such a configuration for sharing the collecting load of printed matters among the users without partiality. Upon completion of printing the printed matter, which is formed based on the received job, the selection section 14 instructs the notification section 15 to send a request for collecting a printed matter to the selected user (step 459). Accordingly, the notification section 15 sends the request for collecting the printed matter by displaying a pop-up on the desk top of the client operated by the selected user, for example. An example of the pop-up displayed at this time is shown in FIG. 9A.

Alternatively, the request for collecting the printed matter may be sent to an e-mail address of the selected user rather than the pop-up.

By the way, even if such a request for collecting the printed matter is sent, there may be (i) a case where the selected user leave his or her seat and (ii) the selected user is seated but he or she is unaware of the sent request. Furthermore, even if the selected user is seated and is aware of the sent request, he or she may want to reject the request for collecting the printed matter for some reason. As a solution to such cases, the exemplary embodiment adopts the configuration that the user who should collect the printed matter, which is formed based on the received job, is determined if the selected user makes an acknowledgement response to the request for collecting the printed matter and the print management apparatus 10 receives this response. That is, when the notification section 15 receives the acknowledgement response from the selected user, the notification section 15 sends it to the selection section 14.

Therefore, after instructing the notification section 15 to send the request for collecting the printed matter, the selection section 14 determines as to whether or not an acknowledgement response is received from the selected user (step 460). Although the owner of the received job may return no acknowledgement response, only the case where the owner having the highest score determined at step 457 returns no acknowledgement response will be described here.

If an acknowledgement response is not received, the selection section 14 repeats steps 457 to 459. In this case, the owner having the highest score determined at step 457 is an owner having the highest score in a state where the owner who is selected but returns no acknowledgement response to the request for collecting the printed matter is excluded.

Figure 9B:
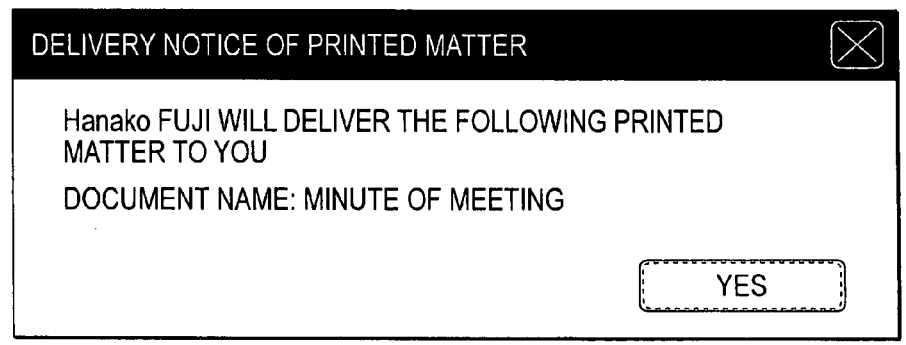

On the other hand, if an acknowledgement response is received, the selection section 14 instructs the notification section 15 to notify the user who is not selected at step 458, namely, the user to whom her printed matter will be delivered that she needs not collect her printed matter (step 461). Accordingly, the notification section 15 displays a pop-up on the desk top of the client operated by the user to whom printed matter is to be delivered, for example, to thereby notify who collects and delivers printed matter. An example of the pop-up displayed at this time is shown in FIG. 9B. Alternatively, notification to the user to who the printed matter is collected and delivered may be sent to an e-mail address of such a user rather than the pop-up.

When the user who should collect the printed matter is determined by performing the process described above, the selection section 14 updates the information regarding the past results of collecting, stored in the user DB 12. In this case, incremented by one is the numeric value between <Receive> and </Receive> for the user to whom the printed matter is delivered in the user DB 12. Also, incremented by one is the numeric value between <Deliver> and </Deliver> for the user who should collect the printed matter (step 462).

Figure 9C:
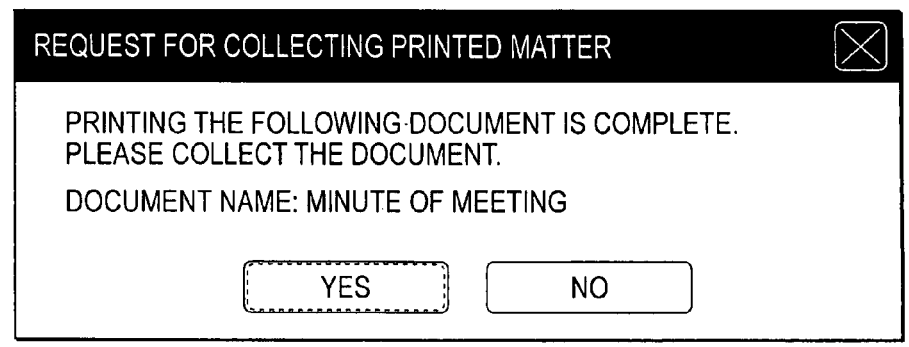

If it is determined at step 451 that no print job exists in the print queue or if it is determined at step 456 that no owner remains in the memory, the selection section 14 instructs the notification section 15 to notify the owner of the received job that he or she is requested to collect his or her printed matter by himself or herself (step 463). Accordingly, the notification section 15 sends a request for collecting the printed matter by displaying a pop-up on the desk top of the client operated by the owner of the received job, for example. An example of the pop-up displayed at this time is shown in FIG. 9C. Alternatively, the request for collecting the printed matter may be sent to an e-mail address of the owner of the received job rather than the pop-up.

By the way, if the print data used in the print job of the user to whom the printed matter is to be delivered and the print data used in the print job of the user who should collect the printed matter are not continuous in the print data storage section 22, the printed matters responsive to the print jobs are not output in succession. In this case, it is concerned that the user who should collect the printed matter may have to wait for output of the printed matter to be collected in front of a printer or may collect the printed matter of any other user than the user to whom printed matter is to be delivered by mistake. Then, in the second exemplary embodiment, after the selection section 14 determines the user who should collect the printed matter, the rearrangement section 16 rearranges the print jobs so that the printed matter of the user to whom printed matter is to be delivered and the printed matter of the user who should collect the printed matter are output in succession. Specifically, if the print data used in the print job of the user to whom printed matter is to be delivered and the print data used in the print job of the user to collect printed matter are not continuous in the print data storage section 22, the rearrangement section 16 rearranges the print jobs so that they become continuous.

To rearrange the print jobs so that they become continuous, the following two cases are conceived. That is, there are (i) the case where after the printed matter of the user to whom the printed matter is to be delivered is output, the printed matter of the user who should collect the printed matter is output and (ii) the case where before the printed matter of the user to whom printed matter is to be delivered is output, the printed matter of the user who should collect the printed matter is output. This is similar to the first exemplary embodiment.

Further, in the second exemplary embodiment, a device for marking the printed matter to be collected may be provided as a device for identifying the printed matter to be collected by the user who should collect the printed matter. For example, identification information of the user who outputs the printed matter may be printed on the printed matter to be collected. The identification information of the user to collect the printed matter may be printed on the printed matter. In these cases, such a configuration may be adopted that when the selection section 14 determines the user who should collect the printed matter, an information addition section (not shown) adds a command for printing the identification information of the user to whom the printed matter is to be delivered or the identification information of the user who should collect the printed matter to the print data to output the printed matter to be collected, stored in the print data storage section 22.

As a method of identifying the printed matter to be collected by the user to collect the printed matter, for example, there are various methods such as a method of shifting the printed matter to be collected from other printed matters for output and a method of rotating the printed matter to be collected for output.

As another embodiment, the print data used in a print job may be stored in the print data storage section 22 in advance and when the user enters an additional output command through an operation section of the print apparatus 20, print may be executed. In this case, when the user enters an output command of the stored print job through the operation section, it may be detected as to whether or not a print job of a different user (a user to whom a printed matter is to be delivered) having some relation with the user who enters the output command exists. If such a print job exists, the printed matter of the different user may be printed together with the printed matter of the user who enters the output command. At this time, for the user who enters the output command, a message indicating that the printed matter of the different user is output together with the printed matter of the user who enters the output command may be displayed on a display section of the print apparatus 20.

Also, some users may want to skip collection of printed matters of other users or may want to prevent any other person from collecting his printed matter. Therefore, a flag as to whether or not a printed matter of any other user may be collected on the way to collection of his/her printed matter may be stored for each user. The above-described process may be applied only to users having the flag set to "ON" (meaning that a printed matter of any other user may be collected).

It is assumed that the computer processing portion in each of the print management apparatus 10 and the print apparatus 20 is implemented as a computer 90, the hardware configuration of the computer 90 will be described.

Figure 10:
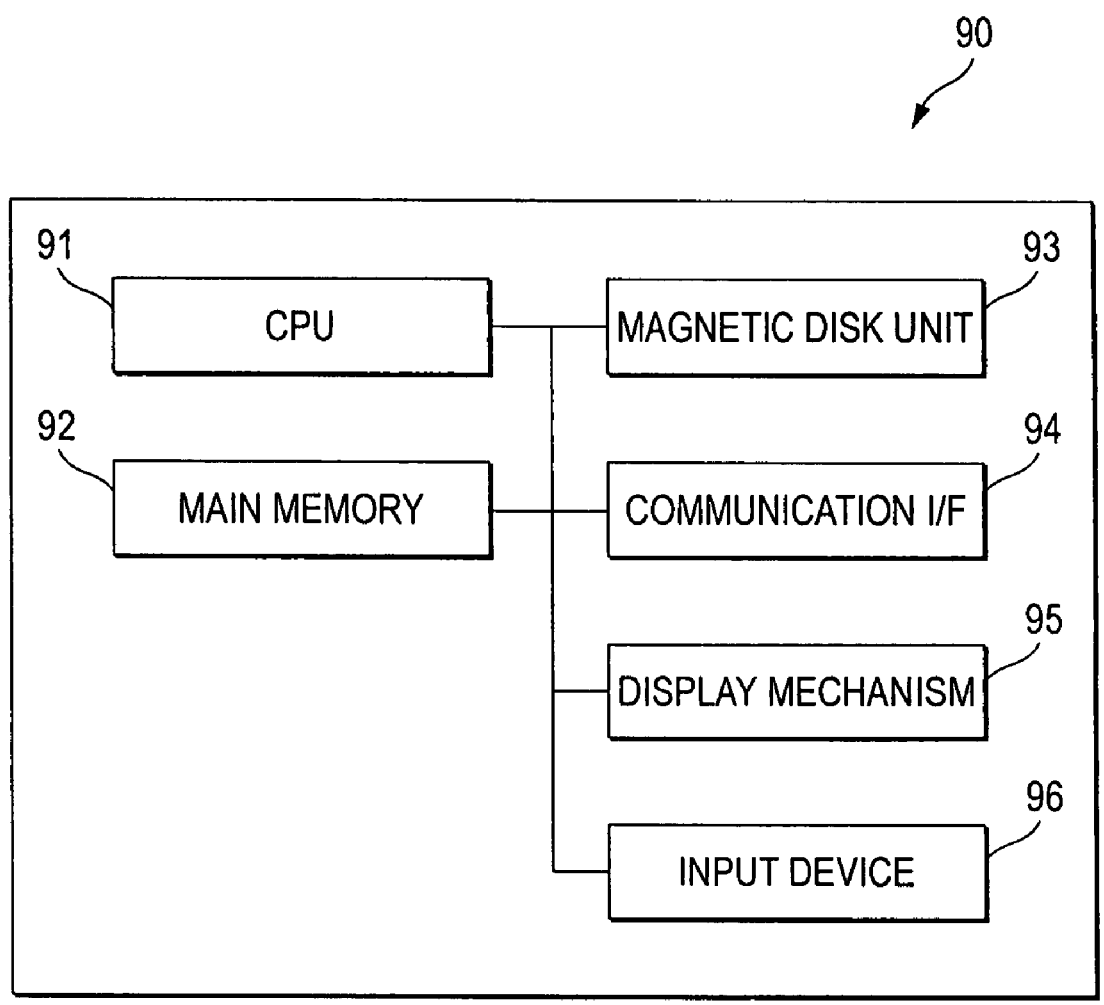
FIG. 10 is a block diagram to show the hardware configuration of a computer according to the exemplary embodiments of the invention.

FIG. 10 is a block diagram to show the hardware configuration of the computer 90.

As shown in the figure, the computer 90 includes a CPU (Central Processing Unit) 91 as computation means and main memory 92 and a magnetic disk unit (HDD: Hard Disk Drive) 93 as storage unit. The CPU 91 executes various types of software of an OS (Operation System), applications, etc., and implements the functions described above. The main memory 92 is a storage area for storing various types of software, data used to execute the software, and the like, and the magnetic disk unit 93 is a storage area for storing input data to various types of software, output data from various types of software, and the like.

The computer 90 further includes a communication I/F 94 for conducting external communications, a display mechanism 95 made up of video memory, a display, etc., and input devices 96 of a keyboard, a mouse, etc.

The program for implementing the exemplary embodiment can be not only provided through communication means, but also provided as the program is stored on a record medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management apparatus comprising:
a job receiving unit that receives a specific print job sent from a first person;
a print data storage unit that stores print data corresponding to a print job which the job receiving unit receives;
a detection unit that detects that specific print data corresponding to the specific print job including a specific print command is stored in the print data storage unit;
a user specifying unit that specifies the first person who instructs the specific print job corresponding to the specific print data detected by the detection unit;
a judge unit that judges whether or not another print data which is different from the specific print data which the detection unit detects exists in the print data storage unit;
a determination unit that determines a second person who sent another print job corresponding to said another print data that exists in the print data storage unit when the judge unit judges that said another print data exists;
a selecting unit that selects the second person determined by the determination unit as a person who is requested to collect printed matters corresponding to the specific print job, which a print unit prints; and
a notification unit that notifies information to request to collect the printed matters corresponding to the specific print job to the second person.

2. The apparatus according to claim 1, further comprising:
a rearrangement unit that rearranges an output order so that a printed matter output in response to the specific print command given by the first person and a printed matter output in response to a print command given by the second person are output in succession.

3. The apparatus according to claim 2, wherein the rearrangement unit rearranges the output order so that the printed matter output in response to the print command given by the second person is output after the printed matter output in response to the specific print command given by the first person.

4. The apparatus according to claim 2, wherein the rearrangement unit rearranges the output order so that the printed matter output in response to the specific print command given by the first person is output after the printed matter output in response to the print command given by the second person.

5. The apparatus according to claim 1, wherein the determination unit determines the second person corresponding to (i) attributes of printed matters output in response to print commands given by respective persons other than the first person, (ii) attributes of the respective person other than the first person, or (iii) past results of collection of the printed matters output in response to the print commends given by the respective persons other than the first person.

6. The apparatus according to claim 1, wherein the second person gives a print command within a predetermined time period before or after the printed matter is output in response to the specific print command given by the first person.

7. The apparatus according to claim 6, further comprising:
a rearrangement unit that rearranges an output order so that the printed matter for which the first person gives the specific print command and a printed matter for which the second person gives the print command are output in succession.

8. The apparatus according to claim 7, wherein the rearrangement unit rearranges the output order so that the printed matter for which the second person gives the print command is output after the printed matter for which the first person gives the specific print command.

9. The apparatus according to claim 7, wherein the rearrangement unit rearranges the output order so that the printed matter for which the first person gives the specific print command is output after the printed matter for which the second person gives the print command.

10. The apparatus according to claim 6, wherein the determination unit determines the second person corresponding to (i) attributes of printed matters output in response to print commands given by respective persons other than the first person, (ii) attributes of the respective person other than the first person, or (iii) past results of collection of the printed matters output in response to the print commends given by the respective persons other than the first person.

11. A print apparatus comprising:
a print unit that prints an image on a medium;
a job receiving unit that receives a specific print job sent from a first person;
a print data storage unit that stores print data corresponding to a print job which the job receiving unit receives;
a detection unit that detects that specific print data corresponding to the specific print job including specific print command is stored in the print data storage unit;
a user specifying unit that specifies the first person who instructs the specific print job corresponding to the specific print data detected by the detection unit;
a judge unit that judges whether or not another print data which is different from the specific print data which the detection unit detects exists in the print data storage unit;
a determination unit that determines a second person who sent another print job corresponding to said another print data that exists in the print data storage unit when the judge unit judges that said another print data exists;
a selecting unit that selects the second person determined by the determination unit as a person who is requested to collect printed matters corresponding to the specific print job which the print unit prints;
a notification unit that notifies information to request to collect the printed matters corresponding to the specific print job to the second person;
a differentiation unit that differentiates the medium on which the image is printed using the specific print data and the medium on which another image is printed using said another print data sent by the second person.

12. The apparatus according to claim 11, further comprising:
a rearrangement unit that rearranges an output order so that a printed matter output in response to the specific print command given by the first person and a printed matter output in response to a print command given by the second person are output in succession.

13. A print apparatus comprising:
a print unit that prints an image on a medium;
a job receiving unit that receives a specific print job sent from a first person;
a print data storage unit that stores print data corresponding to a print job which the job receiving unit receives;
a detection unit that detects that specific print data corresponding to the specific print job including a specific print command is stored in the print data storage unit;
a user specifying unit that specifies the first person who instructs the specific print job corresponding to the specific print data detected by the detection unit;
a judge unit that judges whether or not another print data which is different from the specific print data which the detection unit detects exists in the print data storage unit;
a determination unit that determines a second person who sent another print job corresponding to said another print data that exists in the print data storage unit when the judge unit judges that said another print data exists;
a selecting unit that selects the second person determined by the determination unit as a person who is requested to collect printed matters corresponding to the specific print job, which a print unit prints; and
a notification unit that notifies information to request to collect the printed matters corresponding to the specific print job to the second person.

14. The apparatus according to claim 13, further comprising:
a rearrangement unit that rearranges an output order so that specific print information sent from the first person and print information sent by the second person are output in succession.

15. The apparatus according to claim 11, wherein upon storing of the print data in the print data storage unit, the determination unit determines the second person who sent said another print job corresponding to said another print data within a predetermined time period before or after the image is printed on the medium using the print data for the specific print job sent from the first person.

16. The apparatus according to claim 13, wherein upon storing of the print data in the print data storage unit, the determination unit determines the second person who sent said another print job corresponding to said another print data within a predetermined time period before or after the image is printed on the medium using the print data for the specific print job sent from the first person.

17. A print apparatus comprising:
an acceptance unit that accepts a first print job sent from a first person and a second print job sent from a second person, the second person being different from the first person;
a print data storage unit that stores print data corresponding to a print job which the job acceptance unit accepts;
a detection unit that detects that first print data corresponding to the first print job including a specific print command is stored in the print data storage unit;
a user specifying unit that specifies the first person who instructs the first print job corresponding to the first print data detected by the detection unit;
a judge unit that judges whether or not another print data which is different from the first print data which the detection unit detects exists in the print data storage unit;
a determination unit that determines the second person who sent said second print job corresponding to said another print data that exists in the print data storage unit when the judge unit judges that said another print data exists;
an output unit that outputs a first printed matter in response to the first print job accepted by the acceptance unit and outputs a second printed matter in response to the second print job accepted by the acceptance unit;
a selecting unit that selects the second person determined by the determination unit as a person who is requested to collect printed matters corresponding to the first print job, which the output unit outputs; and
a notification unit that notifies information to request to collect the printed matters corresponding to the first print job to the second person.

18. A print system comprising:
a first transmission unit that transmits a first print job given by a first person;
a second transmission unit that transmits a second print job given by a second person, the second person being different from the first person;
a job receiving unit that receives the first print job given by the first person and the second print job given the second person;
a print data storage unit that stores print data corresponding to a print job which the job receiving unit receives;
a detection unit that detects that first print data corresponding to the first print job including a specific print command is stored in the print data storage unit;

a user specifying unit that specifies the first person who instructs the first print job corresponding to the first print data detected by the detection unit;

a judge unit that judges whether or not another print data which is different from the first print data which the detection unit detects exists in the print data storage unit;

a determination unit that determines that the second person sent said second print job corresponding to said another print data that exists in the print data storage unit when the judge unit judges that said another print data exists;

a selecting unit that selects the second person determined by the determination unit as a person who is requested to collect printed matters corresponding to the first print job, which the output unit outputs; and a notification unit that notifies information to request to collect the printed matters corresponding to the first print job to the second person.

19. The system according to claim 18, wherein the second transmission unit further transmits information to command changing of the determination result made by the determination unit.

20. A non-transitory computer readable medium storing a program causing a computer to execute a print management process, the process comprising:

receiving a specific print job sent from a first person;

storing print data in a print data storage unit corresponding to a print job which is received via the receiving;

detecting that specific print data corresponding to the specific print job including a specific print command is stored in the print data storage unit;

specifying the first person who instructs the specific print job corresponding to the specific print data detected by the detecting;

judging whether or not another print data which is different form the specific print data exists in the print data storage unit;

determining a second person who sent another print job corresponding to said another print data that exists in the print data storage unit when the judging judges that said another print data exists;

selecting the second person determined by the determining as a person who is requested to collect printed matters corresponding to the specific print job, which a print unit prints; and notifying information to request to collect the printed matters corresponding to the specific print job to the second person.

21. The non-transitory computer readable medium according to claim 20, wherein the process further comprises:

rearranging an output order so that a printed matter output in response to the specific print command given by the first person and a printed matter output in response to a print command given by the second person are output in succession.

22. The apparatus according to claim 1, wherein the print jobs is sorted so that a person who collects the printed matter of a specific person is selected from among the persons who have later print order than the specific person and a rearrangement is made so that the printed matter of the specific person is printed just before or just after the printed matter of the specific person.

23. The apparatus according to claim 1, wherein the selecting unit selects a person who is requested to collect from a plurality of persons who respectively transmit the print job of a plurality of print queue which are stored in the print data storage unit.

24. The apparatus according to claim 1, wherein the notification unit receives an acknowledgement from the selected person, the selected person is determined as a person who is requested to collect.

25. The apparatus according to claim 1, wherein when a person who is requested to collect is determined, the notification unit notifies the first person.

26. The apparatus according to claim 1, when another print data does not exist, a person for collecting is selected from a user who finished printing lately.

27. The apparatus according to claim 1, the specific print command is a print command from a specific person who is previously registered.

28. The apparatus according to claim 1, the specific print command is a print command that a request to collect the printed matter by another person is commanded.

29. The apparatus according to claim 1, wherein the notification unit receives an acknowledgement from the selected person, the person who is requested to collect the printed matter is determined.

30. The apparatus according to claim 1, wherein when a user who is requested to collect is determined, the notification unit notifies a person who is not selected by the selecting unit.

31. The apparatus according to claim 1, wherein the notification unit notifies the first person of collecting by himself (herself) when another print data does not exist.

32. The apparatus according to claim 11, further comprising: a differentiation unit that distinguishes, by shifting the printed matters, (i) medium on which the image is printed using the specific print information that transmitted by the first person with (ii) medium on which another image is printed using the other print information transmitted by the second person.

33. The apparatus according to claim 11, further comprising: a differentiation unit that distinguishes, by rotating the printed matters, (i) medium on which the image is printed using the specific print information that transmitted by the first person with (ii) medium on which another image is printed using the other print information transmitted by the second person.

* * * * *